No. 834,445. PATENTED OCT. 30, 1906.
J. E. BECKER.
PLOW.
APPLICATION FILED MAY 11, 1906.
2 SHEETS—SHEET 1.
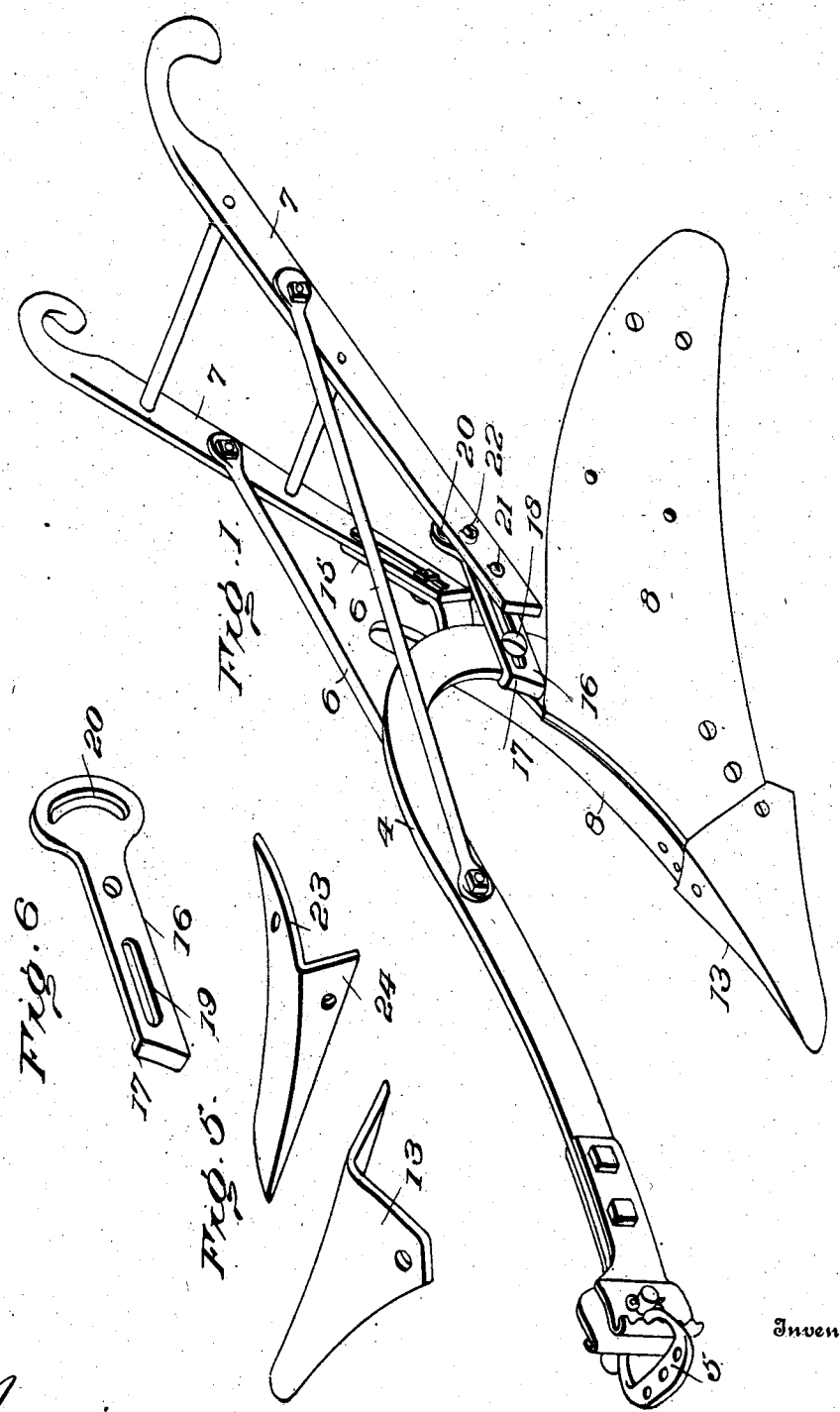

No. 834,445. PATENTED OCT. 30, 1906.
J. E. BECKER.
PLOW.
APPLICATION FILED MAY 11, 1906.
2 SHEETS—SHEET 2.
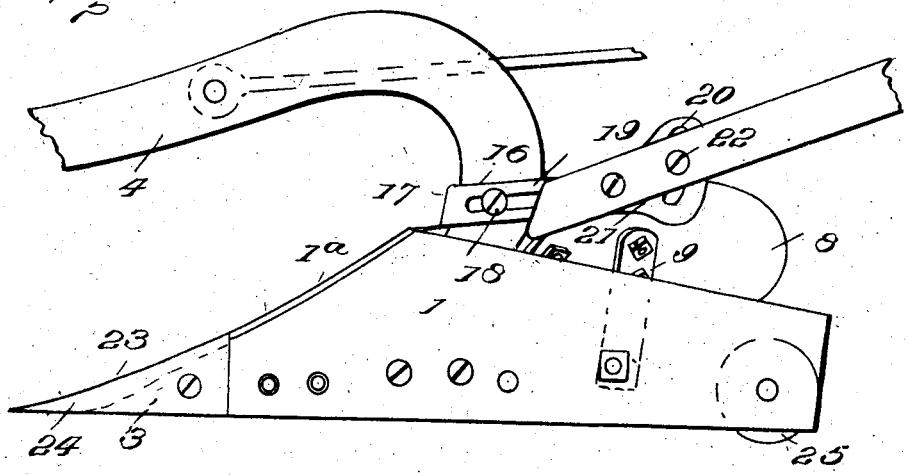
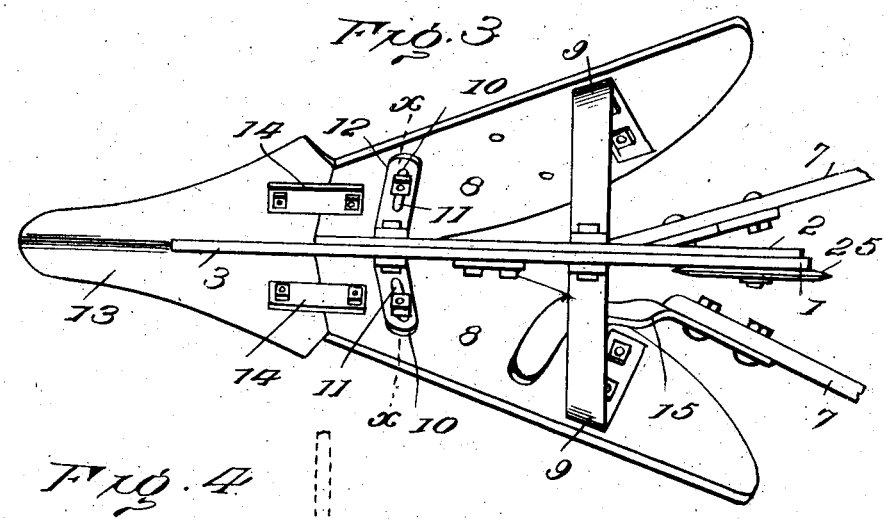
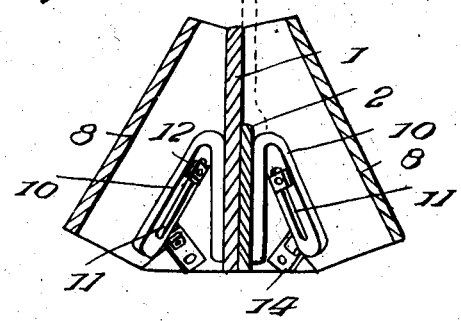
Witnesses
Jn. Imrie
W. N. Woodson
Inventor
J. E. Becker
By
Rba B Lacey, Attorneys

UNITED STATES PATENT OFFICE.

JOSEPH E. BECKER, OF FOREMAN, ARKANSAS.

PLOW.

No. 834,445.        Specification of Letters Patent.        Patented Oct. 30, 1906.

Application filed May 11, 1906. Serial No. 316,344.

*To all whom it may concern:*

Be it known that I, JOSEPH E. BECKER, a citizen of the United States, residing at Foreman, in the county of Little River and State of Arkansas, have invented certain new and useful Improvements in Plows, of which the following is a specification.

My invention contemplates certain new and useful improvements in plows; and the object of the invention is to provide an improved plow which may be readily transformed from a middle-buster to a turning-plow, and vice versa.

In the accompanying drawings, Figure 1 is a perspective view of my improved plow arranged as a middle-buster. Fig. 2 is a side elevation of the plow arranged as a turning-plow. Fig. 3 is a bottom plan view of the plow arranged as a middle-buster. Fig. 4 is a transverse sectional view on the line $x\ x$ of Fig. 3. Fig. 5 is a detail view illustrating the two forms of plowshares employed. Fig. 6 is a detail perspective view of the standard for one of the handles.

Corresponding and like parts are referred to in the following description and indicated in all the views of the drawings by the same reference characters.

Referring to the drawings, the numeral 1 designates the main supporting member of the plow, which in the present instance is in the form of a vertically-disposed plate of steel or similar strong and light metal provided with a horizontal lower edge and an inclined front edge 1$^a$. Secured to the supporting member 1, at one side thereof, for the purpose of strengthening it is a supplemental plate 2, which in effect forms a part of the main supporting member 1. The main supporting member 1 is provided at its front end with a forwardly-projecting tapered nose 3, as shown. To the main supporting member 1 is secured, by nuts or bolts or similar fastening means, the plow-beam 4, provided at its forward end with a clevis 5 and connected by braces 6 to handle 7.

When the plow is arranged as a middle-buster, it is provided with right and left hand wings or moldboards 8. These moldboards 8 are provided at their rear ends with angular braces 9, that are secured to opposite sides of the main supporting member 1 near the rear end thereof, preferably by a bolt that passes through both of them and through a registering aperture in the said main supporting member. The other ends of the braces 9 are bolted or otherwise fastened to the rear ends of the moldboards, as shown. Angular straps 10 connect the front ends of the moldboards to the opposite sides of the main supporting member 1, near the front thereof, preferably by one bolt, which is passed through registering apertures in the said straps and through an aperture in the said main supporting member, as clearly illustrated in the drawings. The other ends of the angular straps are provided with slots 11, and bolts 12 extend through the moldboards near the front end thereof and into the slots and are provided with nuts whereby the front ends of the moldboards may be adjustably secured to the angular straps 10, so that they may be held at their front ends at different elevations. The middle-buster share 13 is designed to fit over the tapered nose 3 of the main supporting member 1 and is detachably secured at opposite sides to both of the moldboards by means of straps 14. One of the moldboards 8 is provided with an upwardly and rearwardly extending standard 15, to which one of the handles 7 is directly connected, and the other moldboard may be likewise provided with one of said standards for the attachment thereto of the other handle, or, if desired, a standard 16 may be employed for the other handle.

The standard 16 is, as shown, provided with a laterally-extending front end 17, taking around the front edge of the beam 4, and is bolted to one side of said beam by a bolt 18, which passes through the beam and through a longitudinal slot 19. By this means the said standard may be adjusted to different angular positions with respect to the beam and also to different longitudinal positions. The other end of the standard 16 is broadened and provided with a transverse slot 20. The handle member that is designed to be secured to the standard 16 is pivotally attached thereto by means of a bolt 21 and is also secured thereto by means of a bolt 22, mounted in the slot 20, so that the said handle member may be adjusted to different angles.

In addition to the middle-buster share 13 I have provided a turning-share 23, and whenever it is desired to change the plow from a middle-buster to a turning-plow it is only necessary to take off the left wing or moldboard of the middle-buster share and substitute for said share the turning-share 23. This latter is angular in cross-section, as shown, and its flat side 24 is designed to fit over the nose 3, as illustrated in Fig. 2. It is secured to the strap 14 of the right-hand moldboard or wing 8.

The operation of changing the plow from the turning-plow to a middle-buster is obviously the reverse of changing from a middle-buster to the turning-plow. Preferably the plow is provided with a draft-disk 25, mounted at the rear end of the main supporting member.

Having thus described the invention, what is claimed as new is—

A plow of the character described, comprising a main supporting-plate, a beam secured thereto, a moldboard and share connected to said plate, an upwardly and rearwardly extending standard 15, a handle secured to said standard, a standard 16 provided with a laterally-extending front end adapted to engage the front edge of the beam and provided with a longitudinal slot, a bolt extending through the beam and mounted in said slot, the said standard 16 being also provided at its rear end with a transverse slot, and a handle pivotally connected to the last-named standard between the two slots, and provided with a bolt mounted in the transverse slot, whereby the handle may be adjusted on the standard.

In testimony whereof I affix my signature in presence of two witnesses.

JOSEPH E. BECKER. [L. S.]

Witnesses:
 ED. C. PENUEL,
 GROVER MILFORD.